United States Patent

[11] 3,612,163

[72] Inventor  Louis Powell
              Palos Verdes Peninsula, Calif.
[21] Appl. No. 867,015
[22] Filed     Oct. 16, 1969
[45] Patented  Oct. 12, 1971
[73] Assignee  The Garrett Corporation
               Los Angeles, Calif.

[54] SUPPORT AND DRIVE MEANS
     7 Claims, 3 Drawing Figs.
[52] U.S. Cl. .................................... 165/8,
              64/15 R, 64/30 A, 165/10, 64/27 R
[51] Int. Cl. ........................................ F28d 19/04
[50] Field of Search............................. 165/8, 9,
     10; 64/15, 15 B, 15 C, 24, 27, 27 B, 27 C, 27 L, 27
                                           S, 30, 30 A

[56]              References Cited
              UNITED STATES PATENTS
1,264,742  4/1918  Aldrich ....................... 64/15
1,658,786  2/1928  Ellis et al. .................. 64/15
3,319,484  5/1967  Prest ........................... 64/30 X
3,476,173  11/1969 Bracken, Jr. et al. ........ 165/9
1,810,204  6/1931  Dickson ....................... 64/27
2,562,166  7/1951  Bendall ........................ 74/233
2,814,187  11/1957 Babaian........................ 64/15
3,057,604  10/1962 Bubniak et al................ 165/9
3,296,829  1/1967  Williams....................... 64/15

Primary Examiner—Albert W. Davis, Jr.
Attorneys—Albert J. Miller and John N. Hazelwood ABSTRACT: A resilient support and drive system for a rotary regenerator.

PATENTED OCT 12 1971　　3,612,163

*INVENTOR.*
LOUIS POWELL

BY
Albert J. Miller
ATTORNEY

3,612,163

SUPPORT AND DRIVE MEANS

BACKGROUND OF THE INVENTION

Rotary heat exchangers or regenerators, that is heat exchangers having a rotor or disc including a rotatable heat absorbent element or matrix that is caused to rotate alternately through streams of hot and cold fluid, have been known for many years. As used with a gas-turbine engine, the high-pressure, low-temperature, turbine inlet gases and the low-pressure, high-temperature, turbine exhaust gases are directed to separate sectors of the rotatable regenerator disc. The regenerator matrix subjected to the exhaust gases will absorb heat therefrom and will transfer this heat to the inlet gases as it rotates into the path of the inlet gases.

The extreme pressure and temperature differentials to which the regenerator is subjected result in a complex system of forces acting upon the regenerator. This situation is compounded when it is attempted to provide a driving connection between the turbine, whose speeds often exceed 30,000 r.p.m. and the regenerator, which normally rotates at less than 25 r.p.m.

Regenerator discs have conventionally been rotated by a rim drive, the simplest form of which is a ring gear mounted around the outside of the regenerator disc and driven by a pinion. While this enables a large speed reduction to be achieved, it requires extreme accuracy in a nonlubricated, high-temperature zone for the gear system to operate properly. This positioning accuracy can be somewhat relaxed by replacing the gear and pinion with a sprocket and chain which includes a tensioner to accommodate thermal expansion variations in the center-to-center distance.

Both rim-drive systems require that a gear or sprocket be attached to the regenerator disc. Elaborate flexible mounts have been required to overcome the large difference in the thermal coefficients of expansion between the disc and rim which is normally metallic. The resulting bulk, however, is not advantageous to integrating the regenerator with a gas turbine.

Center or hub drives have heretofore been avoided since none has been able to limit the transmission of the driving torque through the regenerator disc to acceptable levels.

SUMMARY OF THE INVENTION

The present invention is directed to the drive and support system for a rotary regenerator or other similar apparatus in which differential thermal expansion in a problem. It provides resilient means to accommodate both axial and radial thermal expansion. The system uses existing engine components to provide power.

DESCRIPTION OF THE PREFERRED EMBODIMENTS

Figure 1:
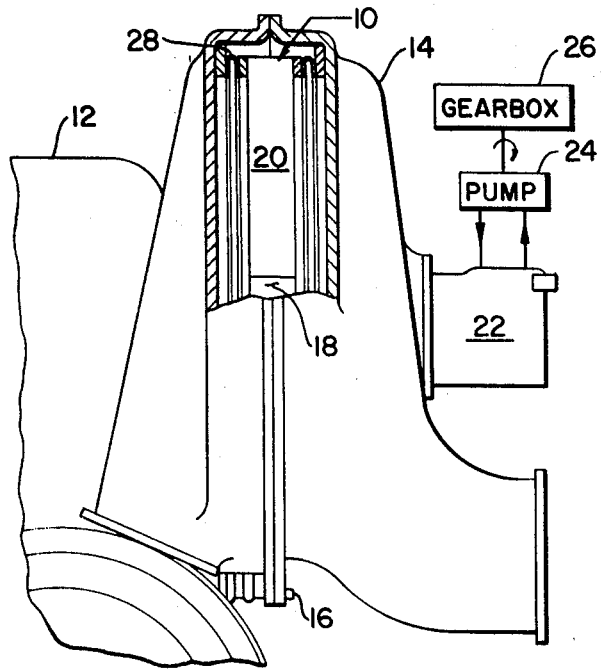
FIG. 1 is an elevation view, part cut away, of a rotary regenerator of the present invention shown in association with a gas turbine.

It is normally desirable, in the interest of compactness and thermal efficiency, to position the rotary regenerator as close as practical to an associated power plant such as a gas turbine. In fact, it is oftentimes convenient to incorporate the rotary regenerator integrally with the gas turbine so that they share the same housing. An integrally related gas turbine and rotary regenerator are shown in FIG. 1.

The regenerator 10 is positioned within the turbine housing 12 and enclosed by an end-cover housing 14 removably affixed to the turbine housing by peripherally spaced bolts 16. The regenerator 10 which basically comprises a solid hub 18 surrounded by a matrix 20 is supported by the end-cover housing 14. Supported on the outside of this cover housing 14 is a hydraulic motor 22 driven by a pump 24 which in a vehicular gas-turbine application may also serve as a power-steering pump. The pump 24 can be driven by an auxiliary gearbox 26 associated either directly or indirectly with the gas turbine. A rubbing seal assembly 28 effectively prevents leakage between the outer periphery of the regenerator 10 and the housings 12 and 14.

Figure 3:
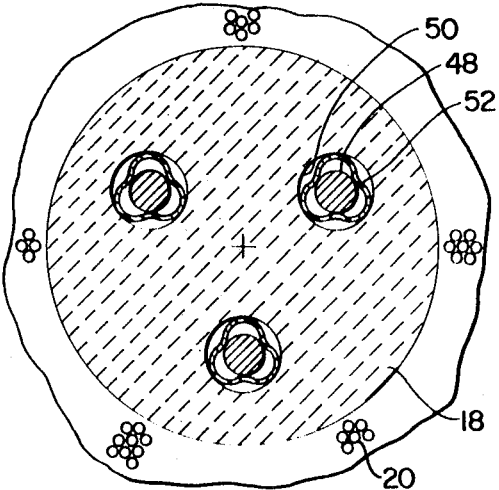
FIG. 3 is a cross section view of the central drive and support of FIG. 2 taken along line 3—3.
Figure 2:
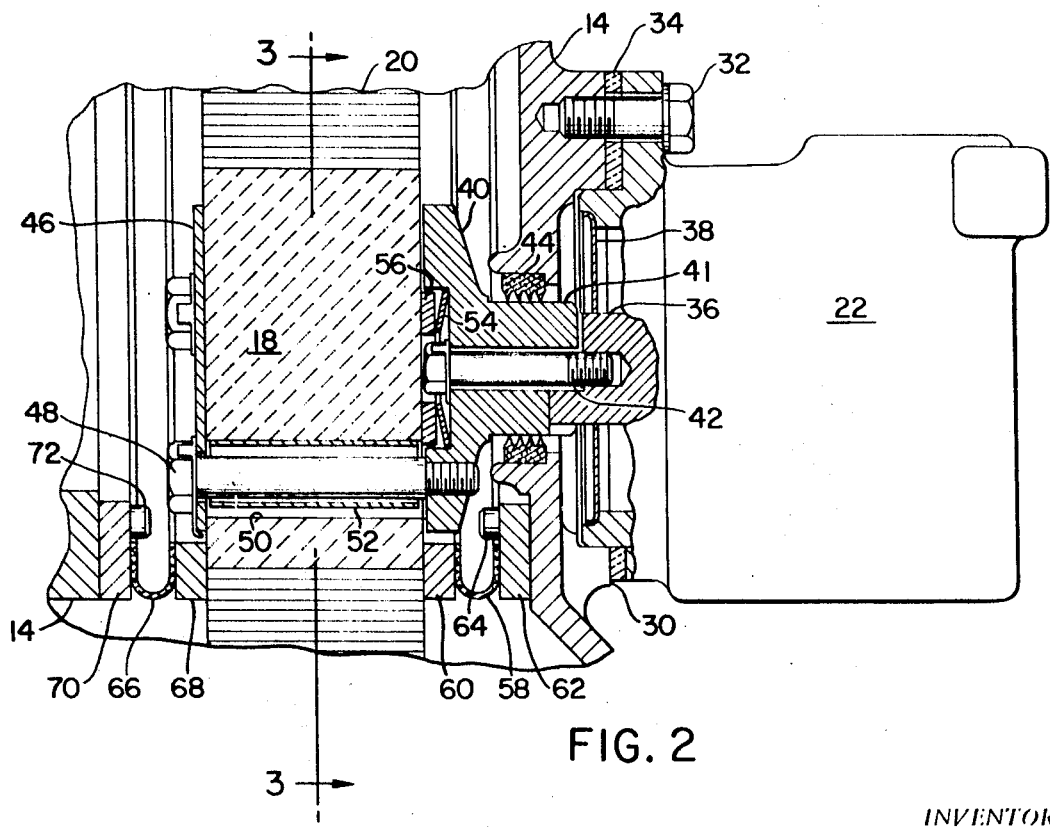
FIG. 2 is an enlarged sectional view of the central drive and support for the rotary regenerator of FIG. 1.

The central portion of the rotary regenerator which includes the drive and support means are illustrated in enlarged detail in FIGS. 2 and 3. The hydraulic motor 22, which can be of the positive displacement type, is affixed to a serrated pad 30 on the outside of the cover housing 14 by a plurality of bolts 32. An insulation block 34 is mounted between the motor 22 and housing 14 to reduce the heat conduction from the housing to the motor. The serrated pad 30 allows cooling air to circulate around the motor shaft 36 and permits any regenerator leakage to escape. A heat shield 38 on the inside face of the motor 22 reduces any direct heat radiation from the regenerator 10.

An adapter shaft 40 is engaged to the motor shaft 36 by a face clutch 41 and retained by a single bolt 42. The shaft 40 extends through a labyrinth seal 44 in the cover housing 14. The solid regenerator hub 18 is held between the adapter shaft 40 and a hub plate 46 by three equally spaced (at 120° intervals) disc retaining bolts 48. Each individual bolt 48 is centered in the hub openings 50 by a formed or shaped spring 52 such as a cloverleaf.

The hub 18 is biased against the hub plate 46 by a Belleville spring 54 held in a recess in the adapter shaft 40. A metallic washer 56 may be placed between the spring 54 and the hub 18.

A "U" or "omega" spring rubbing seal 58 extends between a seal block 60 fixed to the face of the hub 18 and a seal block 62 fixed to the inside of the cover housing 14 by bolts 64. Likewise a "U" spring rubbing seal 66 extends between a seal block 68 on the opposite face of the hub 18 and a seal block 70 fixed to the inside of the turbine housing 12 by bolts 72. The seals define fluid passages through the matrix.

The hub 18 and matrix 20 may be constructed of glass-ceramic material such as a lithia-alumino-silicate formed by the devitrification of glass mixed with nucleating agents. An example of such a glass-ceramic material is Cercor, a registered trademark of Corning Glass Works. Tradenames for other comparable materials are Cer-Vit (Owens-Illinois Co.) and Therma Comb American Lava Corp.). Each of these materials is remarkably resistant to thermal stress as a result of the combination of low thermal expansion, low modulus of elasticity, and a nonrigid cellular structure.

While the hub 18 and matrix 20 do not expand significantly with rising temperatures, the remaining elements of the regenerator, most of which are metallic, do expand. This creates severe differential thermal expansion problems. Further, the glass-ceramic cannot withstand excessive stress.

In the present invention, all metallic parts of the regenerator, except for the disc retaining bolts 48 and the hub plate 46, are situated on the relatively cool side of the regenerator away from the turbine. These help to lessen the thermal-expansion problem. As the metallic parts increase in temperature, most notably the disc retaining bolts 48, they will increase in size, e.g., length and diameter for the bolts 48. The belleville spring 54 will, however, maintain the hub 18 in the same position against the hub plate 46 without any increase in the compressive axial force being exerted on the hub 18. While the overall thermal expansion of the turbine and regenerator housings will be away from the center of the turbine, the expansion of the bolts 48 will be towards the center of the turbine. This helps to maintain the axial position of the regenerator disc relative to the seals and prevents undue face loads on the seals by this self-centering of the disc. The Belleville spring also permits the disc face to stay within the same plane as the seal faces even if they are not exactly normal to the axis of rotation or parallel to each other.

The torque on the hub 18 is equally distributed by the arrangement of bolts 48 spaced around the hub in cooperation with the cloverleaf springs 52. The torque force from each spring 52 to the disc is always distributed to the disc through at least two points of contact, regardless of the orientation of the spring in the hole. The springs also insure that all three bolts share equally the static load and driving torque if one bolt tends to become off center in its hole.

The invention does not require any bearing, gears, sprockets, or chains to run hot and/or unlubricated. The only bearings in the drive are in the hydraulic motor, and they are cooled and lubricated by the hydraulic oil flow through the motor No cross shafting or reduction gearing is required. The hub drive permits great flexibility in positioning the regenerator on the engine since it does not have to determined by the location of the accessory gearbox. With the disc cantilevered from one side of the hub, the whole drive/cover subassembly need not be accurately piloted to the housing. A twin regenerator, that is one regenerator on each side of the engine, is also facilitated by this drive means; two hydraulic motors can be connected in series through a fixed-flow control, pressure-compensated valve to maintain constant speed with varying loads. Sufficient oil flow and pressure can be readily supplied from the power-steering pump if available, or a separate oil pump.

While specific embodiments of the invention have been illustrated and described, it is to be understood that these embodiments are provided by way of example only and that the invention is not to be construed as being limited thereto, but only by the proper scope of the following claims 1. A rotary regenerator center drive and support system comprising:
 a rotatable regenerator disc;
 a housing substantially enclosing said rotatable regenerator disc;
 a center shaft rotatably mounted on one side of said housing and extending from said regenerator disc to the exterior of said housing; and
 mounting means for resiliently affixing said disc to said center shaft to substantially equally distribute driving torque from said shaft to said disc, said mounting means resiliently affixing said disc to said shaft comprise at least three equally spaced bolts extending through said disc and affixed to said shaft, said disc having openings to receive said bolts, a corresponding number of cloverleaf-formed springs interposed between a bolt and opening to bias said bolts towards the center of said openings, and a Belleville-type spring interposed between said shaft and said disc to permit axial deflection of said disc.

2. The rotary regenerator drive and support system of claim 1 and in addition hydraulic motor driving means mounted upon the exterior of said housing to drive said shaft.

3. A center drive and support system for a gas-turbine rotary regenerator having a rotating disc comprising:
 a gas turbine including a housing portion to receive a rotary regenerator rotating disc;
 a rotary regenerator housing mounted housing mounted on said portion of said turbine housing to substantially enclose the rotating disc;
 a center shaft rotatably mounted on said rotary regenerator housing and extending therethrough;
 means for mounting said disc on said center shaft, said mounting means including a Belleville-type spring resilient means interposed between said shaft and said disc to permit axial deflection of said disc and second resilient means affixing said disc to said shaft to substantially equally distribute the driving torque from said shaft to said disc, said second resilient means comprising at least three equally spaced bolts extending through said disc and affixed to said shaft, said disc having openings to receive said bolts, and a corresponding number of cloverleaf-formed springs interposed between a bolt and an opening to bias said bolts towards the center of said openings; and
 a hydraulic motor driving means mounted upon the exterior of said housing to drive said shaft.

4. A rotary regenerator center drive and support system comprising:
 a rotatable regenerator disc having an annular glass-ceramic matrix concentrically arranged about a solid glass-ceramic hub, said hub having three distinct axially extending, through holes spaced at 120° intervals;
 A housing substantially enclosing said rotatable regenerator disc;
 a shaft rotatably mounted through one side of said housing on the same rotational axis as said rotatable regenerator disc and having a flange at one end thereof in juxtaposition with the solid hub of said regenerator disc, said flange having three, axially extending, threaded openings aligned with the three through holes spaced at 120° Intervals around said hub,
 three bolts, one bolt extending through each of said through holes in said hub and threaded into a threaded opening in said flange; and
 three cloverleaf-formed springs, one cloverleaf spring disposed in each through hole in hub around said bolt to bias said bolt toward the center of said through hole.

5. The rotary regenerator center drive and support system of claim 4 wherein said flange at one end of said shaft has a recessed portion facing said hub, an in addition a Belleville-type spring disposed within said recessed portion of said flange to bias said hub away from said flange.

6. The rotary regenerator center drive and support system of claim 5 and in addition a hydraulic motor mounted upon the exterior of said housing to drive said shaft.

7. The rotary regenerator center drive and support system of claim 6 wherein said glass-ceramic regenerator disc is a lithia-alumino-silicate.